United States Patent Office 2,957,852
Patented Oct. 25, 1960

2,957,852
ELASTOMERS DERIVED FROM HYDRAZINE
Peter E. Frankenburg, Kinston, N.C., and August H. Frazer, Wilmington, Del., assignors to E. I. du Pont de Nemours and Company, Wilmington, Del., a corporation of Delaware
No Drawing. Filed Dec. 29, 1955, Ser. No. 556,071
25 Claims. (Cl. 260—75)

This invention relates to a new class of nitrogen-containing polymers and especially to the elastic products obtained from these compositions. This invention also relates to the shaped articles prepared from these copolymers.

Advancing technology creates a constant demand for polymers with improved properties for utilization in such end-use applications as molded objects, films, filaments, fibers, bristles, felts, papers, woven and non-woven fabrics, and the like. There is a particular need for elastic products with increased toughness, better abrasion resistance, increased retractive force, and improved stability on exposure to ultraviolet light. For example, rubber threads are relatively unstable on exposure to ultraviolet light and lose their strength and develop undesirable color relatively rapidly. Synthetic elastomers have been prepared which have equivalent resistance to ultraviolet light, but there is still a definite need for an elastic fiber with improved stability. In addition, there is a need for a polymer for use in elastic fibers which has better oxidative stability than the elastic filaments now available. For many applications, it would be desirable to have elastic fibers which are essentially white and which do not develop undesirable colors on exposure to light and air.

It is also necessary in most textile applications to cover rubber threads to control their mechanical properties. It would be desirable to have available elastomers which can be formed into shaped articles having a relatively wide range of tenacities, elongations, modulus and other properties, which can be obtained in a controlled and reproducible manner. In textile applications it is particularly desirable to have an elastomer which possesses the desirable characteristics described above without the necessity for curing. Improved curable elastomers and cured products with improved properties are also needed. There is a particular need for synthetic elastomer which can be cured quickly and completely at moderate temperatures. Many of the synthetic polymers available require a slow and expensive after-cure at room temperature to develop optimum physical properties.

An object of this invention, therefore, is to provide new synthetic materials capable of being formed into shaped articles, such as molded objects, films, filaments, fibers, bristles, papers, felts, and similar structures. Another object is to produce materials with outstanding abrasion resistance. Another object is to provide synthetic elastic polymers which degrade less rapidly on exposure to oxygen and ultraviolet light, and which are not highly colored and possess better color stability. A further object is to provide linear, synthetic polymers which are particularly adapted to the preparation of filaments, especially those which have high elastic recovery and which do not require curing or cross-linking to obtain these properties. Another object is to prepare linear copolymers which have both a high polymer melt temperature and a low second order transition temperature. Another object is to provide polymers which can be cured completely at moderately elevated temperatures in a short period of time to produce articles which do not become brittle at low temperatures. Another object is to prepared the cured polymers. A further object is to provide methods for preparing the linear and the cured cross-linked polymers.

The objects of this invention are accomplished by reacting hydrazine with low molecular weight polymers provided with at least two end groups capable of reacting with active hydrogen atoms. These low molecular weight polymers are sometimes referred to as "macrointermediates" hereinafter and in the claims. The term polymer is used here in the conventional sense to define a structure containing at least two (and usually many more) of a repeating structural unit. These polymers should have a molecular weight above 700, preferably between 800 and 8,000. To produce polymers which are elastomers at room temperature or products which can be cured to yield polymers which are elastic at room temperature, it is required that the initial reaction product contain about 60 to about 95% by weight of the residues from the low molecular weight polymers which have been reacted with hydrazine. To obtain linear elastic polymers which show high recovery properties at room temperature, it is necessary that the low molecular weight polymer chosen to react with hydrazine melt below about 60° C.

Under the proper conditions and for certain end uses low molecular weight compounds having end groups capable of reacting with active hydrogen may be added along with the polymeric reactant. Conversely, low melocular weight compounds with end groups containing active hydrogen atoms may be added along with the hydrazine. Substituted hydrazines may be used whenever there is one hydrogen atom on each nitrogen atom.

Polymers have been prepared, of course, by reacting hydrazine with low molecular weight monomeric materials. Such processes are described in U.S. Patent 2,512,601 and German Patent 908,071. The products obtained were not elastomers and are obviously outside the scope of this invention.

The substantially linear polymers, which are the primary products of this invention, comprise repeating units containing $$-\underset{X}{N}-\underset{X'}{N}-$$

linked through carbonyl groups

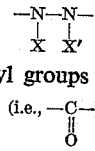

(i.e., $-\underset{\parallel}{\overset{O}{C}}-$)

to two of the valences of a multivalent, preferably divalent, organic radical having a molecular weight above about 700. X and X' represent hydrogen or a monovalent organic radical, preferably a hydrocarbon radical. The organic radicals should be free of groups capable of reacting with active hydrogen and only one of X and X' should be an aromatic radical attached directly to nitrogen, since the basicity of the nitrogen atoms is so low when both X and X' are aromatic that polymer formation is greatly retarded. The divalent organic radicals are derived from compounds having at least two terminal carbon atoms attached to oxygen through a double bond. Examples of these end groups are

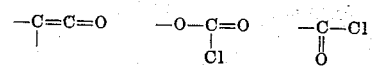

and $-N=C=O$. Low molecular weight polymers suitable as divalent organic radicals to which these end groups can be attached are described hereinafter.

Polymers obtained by coupling difunctional macrointermediates with hydrazine or its derivatives will comprise repeating units of the structure

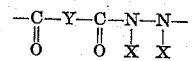

in which X is as defined above, and Y is a divalent organic radical. If an additional active hydrogen compound, such as a diamine, is included in the reaction mixture, random copolymers are obtained which contain

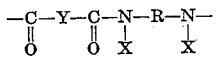

units in addition to the

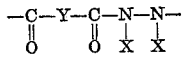

units. In the formula R is a divalent hydrocarbon. If segmented polymers are prepared by including in the reaction mixture a small molecule capable of reacting with active hydrogen atoms, polymers are obtained which contain units with the structure

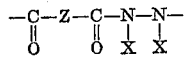

in addition to units with the structure

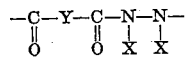

Z is a divalent radical introduced by the reaction of hydrazine with small molecules having at least two complementary carbonyl-containing functional groups, such as isocyanate, acid chloride, etc.

The segmented copolymers of this invention may be represented by repeating structural units of the formula

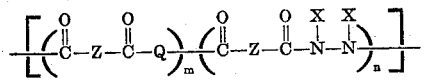

wherein X is selected from the group consisting of hydrogen and a monovalent organic radical, said monovalent organic radical being free of active hydrogen and groups reactive with active hydrogen, not more than one X being an aromatic radical attached directly to a nitrogen, $m$ and $n$ are positive integers, Z is a non-polymeric bivalent organic radical inert to isocyanate groups, and Q is the polymeric residue remaining after removal of the terminal active hydrogens H from a difunctional organic polymer H—Q—H having a melting point below about 60° C. and a molecular weight above about 700, said polymeric residue being free of intralinear nitrogen-to-nitrogen bonds, the radicals Z and X being so selected that the structure

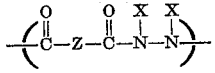

represents a repeating unit of a fiber-forming polymer having a melting point above about 200° C. in its fiber-forming molecular weight range, from about 60% to about 95% by weight of said synthetic copolymer being provided by the structures

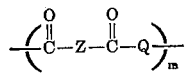

A preferred group of segmented copolymers are those obtained by reacting a difunctional organic polymer with a capping agent, e.g., an organic diisocyanate, and then reacting the product obtained with hydrazine. These copolymers may be represented by repeating structural units of the formula

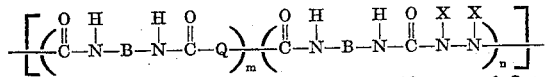

wherein Q, X, $m$ and $n$ have the significance defined above and B is a non-polymeric bivalent organic radical inert to isocyanate groups.

The term "substantially linear" in the foregoing discussion is not intended to exclude polymers which have branches extending out from the main polymer chain. The cross-linked cured products of this invention are generally obtained by reacting the substantially linear polymers with a polyfunctional reagent capable of reacting with active hydrogen atoms. Cross-linked three-dimensional products can also be obtained by using reactants with a functionality greater than two, but this method is generally less satisfactory for most applications, since the polymers can be shaped only with difficulty after they have been formed.

The invention will be more readily understood by referring to the following examples, which are given for illustrative purposes only and should not be considered to represent the limits of the invention.

*Example I*

3 mols of poly(tetramethylene oxide)glycol having an average molecular weight of approximately 1,000 were reacted with 2 mols of 4-methyl-m-phenylene diisocyanate. A low molecular weight polymer having hydroxyl end groups and containing an average of 3 poly(tetramethylene oxide) groups per molecule was obtained. This "trimer" (10 grams) was reacted with 1.68 grams of methylene bis(4-phenylisocyanate) for one hour on a steam bath. This product was dissolved in 150 ml. of methylene chloride along with 1.39 grams of methylene bis(4-phenylisocyanate). To this stirred solution was added 0.29 gram of hydrazine dissolved in 50 ml. of methylene chloride. The polymer precipitated almost immediately upon adding the hydrazine solution. Approximately one liter of methanol was added to the reaction mixture and the methylene chloride removed by distillation. The polymer was washed thoroughly with methanol and dried. The polymer had an inherent viscosity of 1.02, a polymer melt temperature of 260° C., and contained 4.7% nitrogen.

*Example II*

Poly(tetramethylene oxide)glycol (20 grams) having a molecular weight of 1,000 was reacted at 45–55° C. overnight with 8.17 grams of terephthaloyl chloride dissolved in 200 ml. of benzene to produce a polyether diester with acid chloride ends. This was dissolved in 200 ml. of dry dioxan and 2.0 grams of hydrazine hydrate dissolved in a mixture of 100 ml. of dioxan and 20 ml. of absolute alcohol was added. The mixture was stirred for 15 minutes at room temperature and poured into water. The polymer obtained was washed thoroughly with water and methanol and dried. The dry product had an inherent viscosity of 1.80 and a polymer melt temperature of approximately 280° C. Filaments were prepared from this polymer.

*Example III*

Dry poly(tetramethylene oxide) glycol (726 grams= 0.726 mol) was reacted with 84.3 grams (0.484 mol) of 4-methyl-m-phenylene diisocyanate for 3 hours on a steam bath at approximately 90° C. A portion of the resulting product (60 grams=0.0178 mol) was heated on a steam bath for one hour with 9.2 grams (0.0368 mol) of methylene bis(4-phenylisocyanate). This product was added to a cool solution containing 22.2 grams of p,p′-methylenediphenylisocyanate dissolved in 25 ml. of dimethylformamide. This solution was extruded into hydrazine hydrate to produce elastic filaments.

*Example IV*

Poly(tetramethylene oxide)glycol having a molecular weight of 1,000 was reacted with 4-methyl-m-phenylene diisocyanate in a 2:1 molar ratio to provide a "dimer" with hydroxyl ends. This product (50 grams=0.022 mol) was reacted with 11.1 grams (0.0444 mol) of methylene bis(4-phenylisocyanate) for one hour on a steam bath to produce the corresponding "dimer" with isocyanate ends. Purified N,N-dimethylformamide (15 ml.) was added to the cooled product to prepare a spin dope, which was extruded into a bath containing hydrazine hydrate. The as-spun fibers had the following properties after being immersed in boiling water: tenacity=0.11 g.p.d., elongation=537%, initial modulus=0.03 g.p.d., denier=788, stress decay=6.5%, and tensile recovery= 95%.

Example V

Poly(tetramethylene oxide)glycol (40.0 grams) having a molecular weight of 1,000 was heated with stirring at 85° C. for one hour with 20.0 grams of methylene bis(4-phenylisocyanate). The polyether diurethane with isocyanate ends was dissolved in 100 ml. of N,N-dimethylformamide and the solution cooled to 0° C. To this was added 2.0 grams of hydrazine monohydrate dissolved in 50 ml. of N,N-dimethylformamide. The reaction mixture was stirred for 15 minutes while the flask was kept in an ice bath. The polymer had an inherent viscosity of 2.2 when measured in m-cresol solution.

A 30% solution of this polymer was heated to 110° C. and extruded at 100 p.s.i. through a spinneret with five 0.005-inch holes. The filaments were passed through a column of air maintained at 170–185° C. and wound up at 120 y.p.m. Round filaments with the following as-spun properties were obtained: tenacity=0.55 g.p.d., elongation=700%, initial modulus=0.30 g.p.d., tensile recovery=95%, and stress decay=9%.

Example VI

The following ingredients were charged to a flask equipped with a stirrer, nitrogen sweep, and fractionating column: 351 grams (2.4 mols) recrystallized adipic acid, 106 grams (1.71 mols) ethylene glycol, 86.9 grams (1.14 mols propylene glycol). The ethylene glycol/propylene glycol molar ratio in the mixture is 0.6/0.4, and the total quantity of glycol added represents a 20% molar excess over the amount of acid used. Nitrogen was passed through the reactor while the contents were heated for 3 hours. The temperature rose during this period from 130° to 170° C. The reaction mixture was then heated for 15 hours at 165° under atmospheric pressure and then for 24 hours at 200° C. under a pressure of 7–9 mm. The polyester which was obtained was a clear, colorless, viscous liquid with an average molecular weight of approximately 1,350. Analysis showed 1,385 hydroxyl groups and 91 carboxyl groups per million grams of polymer.

This polyester (50 grams) was dissolved in 100 ml. of methylene dichloride along with 18.50 grams of methylene bis(4-phenylisocyanate). The mixture was heated for 2 hours at 90–100° C. while passing nitrogen through the reaction vessel. At the completion of the reaction all of the methylene chloride had evaporated; the reaction mixture was cooled and 200 ml. of N,N-dimethylformamide added to produce a clear solution. Hydrazine hydrate (1.85 grams) dissolved in 50 ml. of N.N-dimethylformamide was added rapidly. The thickened solution was poured into water to precipitate the polymer, which was washed with water and methanol and dried. The dried polymer had a polymer melt temperature of 290° C. and an inherent viscosity in hexamethylphosphoramide of 0.8.

Films cast from the polymer solution prior to precipitation had the following properties after being immersed in boiling water: tenacity=0.45 g.p.d, elongation=895%, initial modulus=0.17 g.p.d., and stress decay=12%.

Example VII

A polymer similar to that of the preceding example was dissolved in N,N-dimethylformamide to produce a spin dope containing approximately 20% solids. This was extruded through a multifil spinneret into water maintained at 40–50° C. The boiled-off as-spun filaments had the following properties: tenacity=0.28 g.p.d., elongation=649%, initial modulus=0.05 g.p.d., tensile recovery=96%, and stress decay=9%.

Example VIII

Adipic acid (79.8 grams=0.55 mol) and 50 grams (0.66 mol) of propylene glycol were charged to a reactor similar to that Example VI. The reaction mixture was heated for 24 hours at 180–185° C. while passing nitrogen through at atmospheric pressure. Heating was continued for another 24 hours at 170° C. under a pressure of 0.1 mm. in a nitrogen atmosphere. A clear, colorless, viscous liquid polyester was obtained with an average molecular weight of 1,710. Analysis showed 1,005 hydroxyl ends and 166 carboxyl ends per million grams of polymer.

This polyester (55.9 grams) was dissolved in 100 ml. of methylene chloride with 16.4 grams of methylene bis-(4-phenylisocyanate). Nitrogen was passed through the reactor while the mixture was heated for 2 hours at 100° C. At the completion of the reaction all of the methylene chloride had evaporated; the reaction mixture was cooled and 240 ml. of N,N-dimethylformamide was added to produce a clear solution. Hydrazine hydrate (1.64 grams) was dissolved in 50 ml. of dimethyl-formamide. One-half of this solution was added rapidly to the solution of polyester with isocyanate ends, and the remainder was added drop-wise to the stirred solution over a period of several minutes.

The reaction mixture was extruded through a multifil spinneret with 0.004-inch holes into a water bath maintained at 80° C. and wound up at 32 feet per minute. The boiled-off as-spun filaments had the following properties: tenacity=0.27 g.p.d, elongation=838%, initial modulus=0.05 g.p.d., stress decay=9%, and tensile recovery=96%.

Example IX

Poly(tetramethylene oxide)glycol (124.5 grams=0.12 mol) having a molecular weight of 1,035 was reacted with 10.50 grams (0.06 mol) of 4-methyl-m-phenylene diisocyanate with stirring in an anhydrous atmosphere for 3 hours at steam bath temperatures. To this "dimer" with hydroxyl ends was added without cooling 30.0 grams (0.12 mol) of methylene bis(4-phenylisocyanate) dissolved in dry methylene chloride and the mixture allowed to react for one hour at steam bath temperatures. The "dimer" with isocyanate ends was allowed to cool and 400 grams of N,N-dimethyl-formamide added. To this solution was added to 3.0 grams (0.06 mol) of hydrazine hydrate dissolved in 26 grams of N,N-dimethylforamide. The resulting polymer solution, which contained 28% solids, was dry spun in the usual manner to produce as-spun filaments with the following properties: tenacity=0.88 g.p.d., elongation=880%, initial modulus =0.05 g.p.d., tensile recovery=97%, and stress decay= 4.2%.

Samples of these filaments were subjected to a variety of after-treatments. Some of the treatments and the properties of the products obtained are described in the following table. When filaments are treated on the bobbin, they are maintained at constant length.

| After-treatment | Tenacity (g.p.d.) | Elongation (Percent) | $M_{50}$ | Stress Decay (Percent) | Tensile Recovery (Percent) |
|---|---|---|---|---|---|
| As-spun filaments (control) | 0.88 | 880 | 0.05 | 4.2 | 97 |
| Treated for 16 hours at room temperature and heated for 4 hours relaxed in "Perclene" | 1.20 | 790 | 0.04 | 2.1 | 98 |
| Cold-drawn 5X prior to winding up and heated in 105° C. air on bobbin for 20 hours | 1.20 | 421 | 0.06 | 2.9 | 95 |
| Cold-drawn 5X prior to winding up and heated in 10 lbs. steam on bobbin for 1 hour | 1.60 | 565 | 0.07 | 2.6 | 98 |
| Drawn 9X at room temperature | 0.98 | 700 | 0.05 | | |

Example X

Poly(tetramethylene oxide)glycol (1 mol) having a molecular weight of 921 is stirred for 17 hours at 80° C. with 1.2 mols of 4-methyl-m-phenylene diisocyanate to obtain an isocyanate-terminated polyurethane. 100 parts of the prepolymer obtained is dissolved in 240 parts by weight of dry tetrahydrofuran. Hydrazine (95% pure) (0.585 part) is dissolved in 89 parts of dry tetrahydrofuran in a nitrogen-filled vessel equipped with a stirrer. To this is added slowly with stirring at room temperature the solution of isocyanate-ended prepolymer. Addition is completed in 20 minutes, and a soft mass of polymer separates from solution. After standing for 1 hour the vessel is flushed with anhydrous ammonia gas and the reaction mixture allowed to stand for 4 days.

After removal of the solvent by evaporation the polymer is milled on a rubber mill at 100° C. to remove traces of solvent. 1,3-bis(3-isocyanato-p-tolyl)urea is added to the polymer (6 parts of urea per hundred parts of polymer) on the mill at 60° C. and milled in thoroughly. The compounded polymer is cured in molds in a press for one hour at 134° C. After five weeks the elastomer showed the following properties at 25° C.: tensile strength at the break=1,140 pounds per square inch, modulus at 300% elongation=670 pounds per square inch, elongation at the break=535%.

Example XI

Poly(tetramethylene oxide)glycol (194.2 parts) having a molecular weight of 929 and containing 0.009% water is heated to 80° C. in a nitrogen-swept vessel equipped with an agitator. To this is added 24.6 parts of 4-methyl-m-phenylene diisocyanate and the reaction mixture stirred at 100° for three hours. A low molecular weight polymer with hydroxyl ends containing an average of three polyether groups is obtained. 4-methyl-m-phenylene diisocyanate (23.6 parts) is added to 209.5 parts of this diurethane glycol and the mixture heated at 60° C. for 17 hours. The product obtained is the corersponding "trimer" with isocyanate ends. This prepolymer (229.4 parts) is dissolved in 762 parts of dry tetrahydrofuran. Hydrazine (95% purity) (2.45 parts) is dissolved in 2,800 parts of dry tetrahydrofuran in a nitrogen-swept vessel equipped with an agitator. The prepolymer solution is added slowly to this over a period of two hours at room temperature. The reaction mass is allowed to stand overnight (17 hours). The tetrahydrofuran is then evaporated and the polymer heated for three hours at 75–85° C. under vacuum.

The polymer is milled on a 100° C. rubber mill and 15 parts of carbon black ("Philblack" O carbon black) and 0.5 part of 2-mercaptobenzothiazole are milled in. Following this, 2 parts of 1,3-bis(3-isocyanato-p-tolyl)urea are milled in. The compounded polymer is cured in molds in a press at 134° C. for 30 minutes. The resulting elastomer shows the following properties: tensile strength at the break=5,100 pounds per square inch, modulus at 300% elongation=2,350 pounds per square inch, elongation at the break=420%.

Example XII

A poly(alkylene oxide sulfide)glycol was prepared by the following procedure: thiodiglycol (549 parts), 1,4-butanediol (405 parts), p-toluenesulfonic acid monohydrate (13.5 parts), and benzene (198 parts) were heated at reflux with stirring for 69 hours in a vessel equipped with a condenser and a Dean-Stark trap. The reflux temperature rises from 85° to 98° C. while 114 parts of water was separated and benzene returned to the vessel. Benzene was then removed along with the water until the temperature in the vessel reached 134° C. Thiodiglycol (82.3 parts) was added and distillation continued until an additional 15 parts of water was distilled off, making a total of 156 parts of water removed during the reaction.

The crude poly(tetramethylene oxide/ethylene sulfide) glycol was boiled with water containing 0.05% of sulfuric acid. The mass was made alkaline by the careful addition of sodium carbonate and boiled again. The aqueous layer was separated and the polymer washed with hot saturated sodium chloride solution containing 1% hydrochloric acid and then with saturated salt solution until the wash was neutral. The mass remaining was heated to 145° C. under vacuum to remove water. It was then cooled, dissolved in 880 parts of benzene, boiled with about 15 parts of "Darco" KB charcoal, and filtered. After removing benzene by distillation the product was heated at 140–150° C. for two hours at a pressure of 0.4 mm. of mercury. The light yellow viscous oil contains 20.4% sulfur, 0.004% water, and had a hydroxyl number of 116, which indicates an average molecular weight of 965.

The polyether-thioether (202.7 parts) was stirred with 24.6 parts of 4-methyl-m-phenylene diisocyanate at 100° C. for 3 hours to form the "trimer" with hydroxyl ends (i.e., a polyether diurethane glycol containing three of the polyether-thioether units). This "trimer" (226.4 parts) was stirred with 24.2 parts of 4-methyl-m-phenylene diisocyanate for 2 hours at 60° C. and then allowed to stand overnight to form the prepolymer with isocyanate ends.

Hydrazine (95% purity) (2.53 parts) was dissolved in 2,675 parts of dry tetrahydrofuran in a nitrogen-swept vessel equipped with an agitator. To this was added at room temperature slowly over a period of 2.5 hours a solution of 246.4 parts of prepolymer in 1,005 parts of dry tetrahydrofuran. The reaction mixture was allowed to stand for 42 hours at room temperature and then was heated at 50–60° C. for 5 hours.

After the solvent was removed by evaporation, the polymer was milled on a rubber mill at 100° C. Carbon black ("Philblack" O carbon black) (15 parts) and 0.5 part of 2-mercaptobenzothiazole were added to each hundred parts of polymer and thoroughly milled in. 1,3-bis-(3-isocyanato-p-tolyl)urea (4 parts) was milled in and the compounded polymer cured in molds in a press for 30 minutes at 134° C. The resulting elastomer showed the following properties after standing for 14 days:

|  | Temperature at which Tested | |
| --- | --- | --- |
|  | (25° C.) | (70° C.) |
| Tensile strength at the break (pounds/sq. inch) | 3,700 | 1,150 |
| Modulus at 300% elongation (pounds/sq. inch) | 1,890 | 900 |
| Elongation at the break (percent) | 470 | 360 |

Example XIII

Sebacyl chloride (7.18 grams=0.03 mol) was dissolved in 20 ml. of dry benzene and the solution placed in a Waring Blendor. A second solution was prepared by dissolving in 50 ml. of dry benzene 2.02 grams (0.02 mol) of triethylamine and 24.20 grams (0.01 mol) of a polyester with a molecular weight of 2,420 prepared from 2,2-dimethyl-1,3-propanediol (pentaglycol) and sebacic acid. This solution was added over a period of 22 minutes to the first solution, which was stirred vigorously and cooled with ice water throughout the addition. The reaction mixture was allowed to stand at room temperature for 4 hours. The triethylamine hydrochloride was filtered off and washed with 40 ml. of dry benzene to remove any retained product.

A solution was prepared by mixing 1.05 grams (0.021 mol) of hydrazine hydrate, 4.24 grams (0.04 mol) of sodium carbonate, 225 ml. of water, and 230 ml. of methylene chloride. This solution was placed in a Waring Blendor and stirred while the filtrate from the above reaction, which contained 0.02 mol of macrodiacid chloride was added. The reaction appeared to be substantially complete in about 56 seconds, but the reaction mixture was allowed to stand an additional five minutes. The solvents were removed by distillation while the aqueous medium was maintained at a pH of 4 to 6. The polymer was filtered, washed, and dried. A polymer with an inherent viscosity in m-cresol of 0.90 and a polymer melt temperature of 230° C. was obtained in 95% yield. A film could be obtained by melt-pressing this polymer at 210° C.

This polymer was melt-spun at 205° C. through a monofil spinneret. The properties of the as-spun and drawn filaments are given in the following table.

| Treatment | Tenacity, g.p.d. | Elongation, Percent | Initial Modulus, g.p.d. | Stress Decay, Percent | Tensile Recovery, Percent |
|---|---|---|---|---|---|
| As-spun | 0.15 | 985 | 0.05 | 8.2 | 95 |
| Drawn 7.5× | 0.21 | 742 | 0.04 | 6.5 | 96 |
| Drawn 7.5× and heat-set in 10 p.s.i. steam for 15 min | 0.26 | 450 | 0.04 | 6.7 | 97 |

*Example XIV*

A polymer was prepared under conditions comparable to those described in Example V except that N,N-dimethylacetamide was used as a solvent in place of N,N-dimethylformamide. The product was obtained in the form of a viscous solution containing approximately 30% of the polymer. This solution was extruded through a spinneret containing a single 20-mil hole into a water bath maintained at a temperature of 80–95° C. The filaments obtained were processed and wound up at the rate of approximately 50 yards per minute. After being boiled off in the relaxed state the as-spun filaments had the following properties: tenacity=0.53 g.p.d., elongation=677%, $M_{50}$=0.05 g.p.d., stress decay=4.3%, and tensile recovery=94%. Some of the filaments were drawn 5× at room temperature and collected on a bobbin which was placed in 10 p.s.i. steam for one hour. These high modulus filaments had the following properties after boil off: tenacity=1.40 g.p.d., elongation=432%, $M_{50}$=0.31 g.p.d., stress decay=7.8%, and tensile recovery=99%.

*Example XV*

A polymer was prepared as described in Example IX except that the poly(tetramethylene oxide) glycol used had a molecular weight of 1,600. The product was obtained in the form of a N,N-dimethylformamide solution containing approximately 20% of the polymer. This solution was extruded as described in the preceding example and the relaxed as-spun filaments obtained had the following properties: tenacity=0.68 g.p.d. elongation=763%, $M_{50}$=0.03 g.p.d., stress decay=2.8%, and tensile recovery=99%.

*Example XVI*

A polymer was prepared as described in Example V except that the poly(tetramethylene oxide) glycol had a molecular weight of 3,000. The polymer was obtained in the form of a 20% solution in N,N-dimethylformamide, which was extruded as described in the preceding experiment. The relaxed as-spun filaments obtained had the following properties: tenacity=0.33 g.p.d., elongation=421%, and $M_{50}$=0.04 g.p.d.

*Example XVII*

N,N' - diisobutylhexamethylenediamine (127 grams) and 454 grams of calcium hydroxide were dispersed in two liters of dry benzene. To this dispersion was added a solution 146 grams of the bischloroformate of 2,2-dimethyl-1,3-propanediol in 1 liter of dry benzene. The solution was added slowly and the reaction mixture stirred overnight at room temperature. The reaction mixture was filtered and benzene removed from the filtrate. To the concentrate was added 2.5 liters of acetone, 700 ml. of water, and 35 grams of sodium carbonate and the mixture refluxed overnight. The acetone and water were distilled off. A liter of benzene was added, the reaction mixture filtered, and the filtrate concentrated. The hydroxyl-ended polyurethane obtained had a molecular weight of 4200.

The polyurethane (21.0 grams) obtained above was mixed with 2.5 grams of methylene bis(4-phenylisocyanate) and heated for 2 hours at 85° C. The reaction mixture was dissolved in 75 ml. of N,N-dimethylformamide and to this solution was added a solution of 0.25 gram of hydrazine hydrate in 25 ml. of dimethylformamide. The reaction mixture was stirred for 15 minutes and the solution obtained was cast to form a film with the following properties: tenacity=0.42 g.p.d., elongation=600%, initial modulus=0.08 g.p.d., stress decay=13%, and tensile recovery=94%.

"Initial modulus" is determined by measuring the initial slope of the stress-strain curve. "$M_{50}$" is stress/strain at 50% elongation. "Polymer melt temperature" is the minimum temperature at which a sample of the polymer leaves a wet, molten trail as it is stroked with moderate pressure across a smooth surface of a heated brass block. "Elastic recovery" or "tensile recovery," as used here, is the percentage return to the original length within one minute after the tension has been released from a sample which has been elongated 50% at the rate of 100% per minute and held at 50% elongation for one minute. "Stress decay" is the percent loss in stress in a yarn one minute after it has been elongated to 50% at the rate of 100% per minute.

The macrointermediate or low molecular weight polymer or prepolymer (the terms being used interchangeably here) may be any homopolymer or copolymer with a molecular weight above about 700, provided that it has at least two groups capable of reacting with the hydrogen atoms of hydrazine and has a functionality of two or a little above so that tractable high molecular weight polymers may be prepared readily. Difunctional macrointermediates are usually preferred. These macromolecules may contain a single type of linkage, such as the ether linkages in the poly(alkylene oxide) glycols or the ester linkages in polyesters, or they may have more than one type of linkage, as in the polyoxythiaalkylene glycols. Even where the linkages are the same, the compositions may be copolymers, such as a copolyester or a copolyether. Copolymer formation is a useful method for modifying the properties of the low molecular weight polymer. This low molecular weight polymer or copolymer may be a polyether, polyether-thioether, polyester, polyurethane, polyurea, polyamide, polysulfonamide, hydrocarbons, polysiloxane, and the like. These polymer chains may contain aromatic groups, and they may be substituted with halogen, alkyl, nitro, alkoxy, and similar groups which do not interfere with the subsequent polymerization under the conditions being used. For the preparation of elastic products the proper reactants are chosen to produce a low molecular weight polymer with the required low melting point. Compounds with the desired combination of high molecular weight and low melting point are usually obtained by interrupting the structure frequently with side chains or by introducing atoms other than carbon atoms into the main polymer chain, e.g., oxygen, sulfur, nitrogen, and silicon, as noted in the foregoing disclosure.

Polyurethanes suitable for use as macrointermediates can be prepared by reacting the bischloroformates of glycols, such as ethylene glycol, cyclohexane diol, propylene glycol, butylene glycol, 2,2-dimethylpropanediol, or the polyether glycols, with a primary or secondary diamine, such as hexamethylenediamine, 1,4-diaminocyclohexane, p-phenylenediamine, ethylenediamine, propylenediamine, butylenediamine, and piperazine. The following are preferable for preparation of macrointermediates which are to be used for the preparation of elastomers particularly suited for filament applications: the aliphatic diamines, such as ethylenediamine, propylenediamine, butylenediamine, pentamethylenediamine, hexamethylenediamine, and N,N - diisobutylhexamethylenediamine. Polyurethanes derived from polyethers are far superior for use in preparing polymers which are to be cured. Many of the examples illustrate this type of macrointermediate, which contain relatively few urethane linkages and are prepared by reacting a diisocyanate with a polyether having a molecular weight above about 700.

Polyureas may be obtained by (1) reacting diamines with phosgene, (2) reacting phosgene with a diamine to form a biscarbamyl chloride, which is reacted subsequently with another diamine or more of the same diamine to form a polyurea, or (3) by reacting a diamine with a diisocyanate. Polyamides are prepared by reacting acids or their amide-forming derivatives, particularly the acid halides with diamines. To prepare the low molecular weight polymers required as macrointermediates for elastomers, it is preferred that all of the intermediates used to prepare these two classes of polymers be aliphatic. Lower melting products are usually obtained when long-chain or branched-chain intermediates are used. Disecondary diamines, such as N,N'-di-isobutylhexamethylene diamine, are particularly useful intermediates for preparing low melting polyureas and polyamides.

Low molecular weight polyesters can be prepared by reacting acids, esters, or acid halides with glycols. Suitable glycols are the polymethylene glycols, e.g., ethylene, propylene, butylene, decamethylene, substituted polymethylene glycols, such as 2,2-dimethyl-1,3-propanediol and heterocyclic glycols, such as cyclohexanediol. These glycols may be reacted with the proper molar ratio of aliphatic, cycloaliphatic, or aromatic acids or their ester-forming derivatives to produce low molecular weight polymers. Suitable acids for preparing polyesters and/or copolyesters are succinic, adipic, suberic, sebacic, terephthalic, and hexahydroterephthalic; the alkyl- and halogen-substituted derivatives of these acids may also be used. The diacid halide derivatives of these acids have been useful in preparing "dimers" and "trimers" (i.e., low molecular weight polymers containing two or three macroglycol units) with acid halide ends, which have been found useful for preparing the elastic polymers of this invention.

The halogens in the acid halides and bis(haloformates) may be chlorine, bromine, iodine, or fluorine. Generally, they will be chlorine.

Suitable hydrocarbon chains include those derived from polyisobutylene. Polyisobutylene dicarboxylic acids can be prepared by the nitric acid oxidation of butadiene-isobutylene copolymers. In butadiene-isobutylene copolymers with small percentages of butadiene there are large segments of isobutylene separated by butadiene units, each butadiene unit having a double bond after polymerization. Ths polyisobutylene segments in copolymers containing approximately 1% unsaturation have molecular weights of 3,000-4,000. If these copolymers are oxidized with nitric acid, the double bonds are attacked and the products isolated are difunctional macromolecules which are essentially polyisobutylene with carboxyl ends. These products have an average molecular weight of 3,300 to 3,500 and good difunctionality as indicated by the agreement between the ebullioscopic molecular weight and the molecular weight calculated from end-group analysis.

Equally satisfactory are low molecular weight poly-isoprene, polybutadiene, and similar derivatives terminated with amine groups. Representative macrointermediates of this class are described more fully in U.S. 2,647,146. Of course, it will be necessary to react these low molecular weight polymers with appropriate difunctional reagents, such as diacid chloride or diisocyanate, to provide end groups capable of reacting with hydrazine.

Polysiloxanes with molecular weights of 3,000–4,000 are another useful class of macrointermediates. The first step in the preparation is the polymerization of dihalodialkylsilanes in the presence of a monobromoalkyl- or monobromaryl-dialkyl halosilane. In general, the molecular weight of these bromine-terminated polysiloxanes is determined by the amount of chain terminator used. They are converted to nitriles (e.g., by reaction with sodium cyanide), which are reduced to the corresponding amines or hydrolyzed to the corresponding acids and provided with suitable end groups, if necessary, prior to use in this process.

One of the preferred classes of low molecular weight polymers is the polyethers. Representative difunctional polyethers which may be used include the poly(alkylene oxide)glycols, such as poly(ethylene oxide)glycol, poly-(propylene oxide)glycol, poly(tetramethylene oxide)glycol, poly(pentamethylene oxide)glycol, poly(hexamethylene oxide)glycol, poly(heptamethylene oxide)glycol, poly(octamethylene oxide)glycol, poly(nonamethylene oxide)glycol, and poly(decamethylene oxide)glycol; the dicarboxymethyl acids of poly(alkylene oxides), such as the one derived from poly(tetramethylene oxide)

HOOCCH$_2$(OCH$_2$CH$_2$CH$_2$CH$_2$)$_x$OCH$_2$COOH or their esters; polydioxolane and other formals prepared by reacting formaldehyde with other glycols, such as pentamethylene glycol, or mixtures of glycols, such as a mixture of tetramethylene and pentamethylene glycols. Mixtures of glycols may also be used to prepare copolyethers, e.g., one which would have both ethylene oxide and tetramethylene oxide units in the polyether chain. Some of the alkylene radicals in these polyethers may be replaced by arylene or divalent cycloaliphatic radicals. For example, poly(tetramethylene oxide)glycol can be reacted with xylylene dibromide in an alkaline medium to provide a new polyether containing one or more xylylene radicals. If not already provided with a suitable end group, as is the case with the dicarboxymethyl acids described above, the polyethers are provided with suitable types of functional end groups for use in this type process.

A variety of active ends on the low molecular weight polymers are suitable for reaction with hydrazine. These include acid halide, haloformate, carboxyl, ester, ketene, and isocyanate. Of these the acid halide and the isocyanate groups are the most useful. These end groups can be provided as a result of the method of preparation of the low molecular weight polymer. For example, a polyamide with acid halide ends can be obtained by reacting a diamine with an excess of diacid halide under the proper conditions to prepare a low molecular weight polymer with acid halide ends.

These end groups can also be provided by reacting small difunctional molecules with a coreactive low molecular weight polymer which does not contain suitable end groups for reacting with hydrazine. For example, a low molecular weight polyether glycol can be reacted with sufficient diisocyanate to produce a polyether diurethane with isocyanate ends. Similarly, the polyhydrocarbon diamines referred to earlier can be converted to diisocyanates by the usual methods, such as reacting with phosgene and dehydrohalogenating.

Suitable acid halides are those derived from polycarboxylic and polysulfonic acids, such as oxalic, succinic, adipic, suberic, azaleic, sebacic, isophthalic, terephthalic, hexahydroterephthalic, 1,5-naphthalenedisulfonic, 1,2-ethanedisulfonic, and 1,6-hexanedisulfonic acids. Suitable organic diisocyanates which may be employed include aromatic, aliphatic, and cycloaliphatic diisocyanates and combinations of these types. Representative compounds include 4-methyl-m-phenylene diisocyanate, m-phenylene diisocyanate, 4,4'-biphenylene diisocyanate, methylene bis(4-phenylisocyanate), 4-chloro-1,3-phenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4' - methylene-bis(cyclohexylisocyanate), and 1,5-tetrahydronaphthalene diisocyanate. Arylene diisocyanates, i.e., those in which each of the isocyanate groups is attached directly to an aromatic ring are preferred. In general, they react more rapidly than do the alkylene diisocyanates. The diisocyanates may contain other substituents, although those which are free from reactive groups other than the two isocyanate groups are ordinarily preferred. In the case of the aromatic compounds the isocyanate groups may be attached either to the same or to different rings. These same considerations apply to the diacid halides just discussed. Dimers of the monomeric diisocyanates and di(isocyanatoaryl)-ureas, such as di(3-isocyanato-4-methylphenyl)urea may be used.

Suitable haloformates may be prepared by reacting glycols with an excess of phosgene.

The products obtained by reacting hydrazine with low molecular weight polymers with acid chloride ends will be referred to as polyhydrazides, in conformance with the nomenclature used for products obtained by reacting low molecular weight dibasic acids or diacid halides with hydrazine. However, the structures obtained by reacting hydrazine with bishaloformates and diisocyanates have apparently not been prepared previously. Since the hydrazine dibasic acid reaction products have not been referred to as polyamides, it appears desirable that these new structures be given distinctive names because of their unique structure. The products obtained from the reaction of bishaloformates with hydrazine contain two urethane

groups connected head to head. Accordingly, these might be considered to be bis-urethanes, and the polymers called poly(bis-urethanes). The products obtained from the reaction of diisocyanates with hydrazine contain adjacent ureylene (—NHCONH—) linkages. These polymers could be referred to as poly(bis-ureyienes) but, for simplicity, will be called polyureylenes.

The elastomeric products of this invention may be prepared according to several different procedures. These methods possess the common feature that they are carried out at moderate temperatures. Generally temperatures at or near room temperature are preferred. This is particularly true for the elastomers prepared by reacting diisocyanates with hydrazine, since infusible, insoluble gels tend to form at temperatures much above about 40° C.

One method is to mix the low molecular weight polymer with hydrazine in suitable mixing equipment. The reaction mass may become quite viscous and heavy-duty mixing equipment may be required. When the mass forms tough, rubbery clumps or crumbs or begins to pull away from the mixer, it may be removed from the mixer and worked on a rubber mill to form a smooth band.

These polymers can also be prepared by inter-facial polymerization, which is a rapid, moderate temperature reaction in which the reactants are brought together in such a way that the reaction zone is at, or is immediately adjacent to, a liquid-liquid interface. Thus, most of the molecules of at least one of the reactants must diffuse through liquid diluent to arrive at the reaction zone. For example, the reactant in one liquid phase may be hydrazine and the reactants in the other liquid phase may be one or more diacid halides. The two liquid phases are mixed to form a two-phase system in which the hydrazine and the diacid halide are in separate phases, at least one of which includes a liquid diluent. Preferably, a reactant is a liquid under the reaction conditions or is dissolved in a diluent, but one of the reactants may be dispersed or suspended as a finely divided solid in a diluent which will dissolve it at least partially. The phases are mixed until the desired condensation polymerization has taken place and then, if desired, the polymers obtained are isolated. In the foregoing discussion the term "diacid halide" includes bis(haloformates), biscarbamyl halides, and the acid halide derivatives of dicarboxylic and disulfonic acids. Although these materials are not completely equivalent in their behavior, they have been grouped together here to simplify the discussion. Diisocyanates can be reacted with active hydrogen compounds under conditions similar to those used for acid halides.

The polymers may also be prepared by carrying out the reaction in a homogeneous solution, as is amply demonstrated by the examples. The method used involves dissolving hydrazine in a solvent and one or more complementary reactants in separate portions of the same solvent, and then mixing the solutions under conditions suitable for forming high molecular weight polymers. The molecular weight of the polymers can be controlled by the choice of the solvent medium or by the use of mixtures of appropriate solvents. The solvent is usually one which is relatively inert to the reactants. Suitable solvents for use in this process include N,N-dimethylformamide, N,N - dimethylacetamide, tetrahydrofuran, tetramethylurea, dimethyl sulfoxide, Cellosolve, and mixtures of acetone and tetrachloroethylene with N,N-dimethylformamide. Acid acceptors are used in the system when an acid is liberated by the reaction to facilitate formation of high molecular weight polymers.

A small molecule having end groups which are the same as, or equivalent in reactivity to, the end groups of the low molecular weight polymer may also be included in the mixture of monomers used to prepare the polymers. For example, a polyether which has been provided with isocyanate end groups by reaction with methylene bis 4-phenylisocyanate) may be mixed with excess methylene bis(4-phenylisocyanate) and reacted with hydrazine, as described in Example I. The aromatic diisocyanate reacts with some of the hydrazine to form a segment of a high melting polymer which is connected at each end to a molecule of the low molecular weight polymer. This type of polymer is referred to as a "segmented" copolymer.

A different type of copolymer is obtained if another compound with active hydrogen atoms is added along with the hydrazine to react with the low molecular weight polymeric coreactant. In this case the product is a random copolymer in which some of the linkages between the low molecular weight polymer units are derived from hydrazine, and the remaining linkages are derived from the added compound containing active hydrogen atoms. Examples of compounds with these active hydrogen atoms are diamines, dicarboxylic acids, and glycols. Of these, the diamines, particularly the low molecular weight diamines, such as ethylene and propylene diamine, are the most useful, since they possess reactivities more nearly equivalent to that of hydrazine.

The polymers obtained when hydrazine is used alone or with another active hydrogen compound are referred to as "coupled" polymers, since they have only a small molecule linking the units of the original low molecular weight polymer. The "coupled" polymers are the preferred products of this invention, since they tend to be more soluble in common solvents suitable for extrusion processes.

The product obtained by reacting hydrazine with a difunctional low molecular weight polymer (i.e., prepolymer or macrointermediate) is a substantially linear product in the form of an elastic, homogeneous solid which can be cured to form a vulcanized elastomer. The elastic nature of this product is dependent upon the materials selected to react with the hydrazine. If the macrointermediate is a low melting material (i.e., below about 60° C.) with the molecular weight in the upper end of the range (about 3,000 to about 8,000), the product will tend to be a rather soft moderately elastic product which is well suited for applications where a curing agent will be used, such as in the preparation of molded sheets, bars, tubes, rods, and in the preparation of foams.

The toughness and "snap" of the linear polymer can be increased by using a lower molecular weight macrointermediate (e.g., in the 1,000–2,500 molecular weight range) or by using "capping" agents (e.g., aromatic diisocyanates which are reacted with polyethers to provide them with isocyanate ends) which react with hydrazine to form a segment of a high melting polymer. Satisfactory linear elastomers are obtained from higher molecular weight macrointermediates if "segmented" polymers are prepared. It is necessary for the prepolymer or macrointermediate to melt below about 60° C. to obtain linear products suitable for the formation of filaments with good elastic properties at room temperature.

The softer final products obtained from the reaction with hydrazine, particularly those which melt at temperatures of about 100° C. or less, are ideally suitable for the preparation of cured molded objects, since they can be readily deformed under low pressures. Any of the compositions will be suitable as long as there are residual active hydrogen atoms (e.g., the hydrogen on the nitrogen atoms of the hydrazine residue) to provide suitable sites for cross-linking. Any suitable curing agent, such as a polyisocyanate, may be used. If free isocyanate groups are present in the products which have been prepared by reacting hydrazine with low molecular weight polymers having isocyanate ends, the product is curable without the addition of any extra curing agent. This product may be molded and cured directly or may be stabilized against premature curing by the addition of small amounts of a nitrogen base containing at least one hydrogen atom attached to nitrogen. If substantially all of the isocyanate groups have been used up by the reaction, the product will be stable and will not cure until additional di- or tri-isocyanate or other curing agent is added. Any of the diisocyanates listed previously are suitable for use as curing agents. Diisocyanate dimers and such compounds as 1,3-bis(3-isocyanato-p-tolyl)-urea are particularly convenient curing agents. Curing is often facilitated by incorporating a small amount of magnesium oxide with the uncured elastomer. In practice, the addition of from 1 to 20% of a diisocyanate, based on the weight of the uncured reaction product, is adequate for the curing of stabilized products. The diisocyanate may conveniently be mixed with the uncured product on a rubber mill, and the mixture may then be cured by placing it in a mold and heating under pressure. Only enough pressure is required to force the elastomer to assume the shape of the mold. The temperatures and pressures used in ordinary rubber processing are satisfactory for use in curing the elastomers of this invention. Pressures of 50 to 1,000 pounds per square inch or higher and temperatures of from 80 to 175° C. are ordinarily satisfactory. At the higher temperatures, shorter curing times must be used to avoid degrading the product. Most of the polymers of this invention may conveniently be cured or vulcanized by heating at 130–135° C. for about 30 minutes. As has been pointed out previously, one of the advantages of the products of this invention is the completeness of the cure in a short period of time under moderate conditions.

When the reaction has been carried out in a solvent in which the reaction product remains soluble, films or coatings may be formed by pouring or otherwise applying the solution to form a thin film and allowing the solvent to evaporate. Curing can take place simultaneously if a curing agent is present.

A number of uses have been indicated for the relatively softer elastic products of this invention. However, products of this type are generally not particularly useful in the filament and fiber field, since after-treatments to improve the properties (e.g., by cross-linking) are difficult to carry out and are generally unstisfactory. Accordingly, there is a particular group of these elastomers which are particularly useful for fiber and filament applications and for the preparation of films by direct extrusion processes which require no after-curing or after-treatment. The polymers of interest here are substantially linear polymers capable of forming filaments with a tensile recovery above 90% and a stress decay below 20% without a curing or cross-linking treatment. Suitable polymers can be prepared by controlling the molecular weight and melting point of the low molecular weight polymeric intermediate and selecting a "capping" agent which combines with hydrazine to form a high melting polymer.

Where macrointermediates are provided with suitable end groups for reacting with hydrazine by the use of a "capping" agent, this agent should be one which when reacted with hydrazine alone, forms a polymer with a melting point above 200° C. when the molecular weight is high enough to be in the fiber-forming range. This minimum melting point applies to the segmented polymers. As the high melting segment produced by the reaction of hydrazine with the "capping" agent becomes shorter (i.e., contains less units of the polymer), the melting point of this segment should be higher. In the coupled products, where the chain length of the high melting component has been reduced to the minimum (i.e., the macromolecular segments are separated by single units of the polymer), it is preferred that this component be the repeating unit of a polymer with a melting point above 250° C. in the fiber-forming molecular weight range. Generally speaking, this latter type has been found to be the most satisfactory for filament and fiber applications.

Conventional procedures can be used for preparing films and filaments from these polymers. For example filaments can be prepared readily by dry spinning in conventional equipment. Solvents which have been found satisfactory for preparing solutions of suitable concentration for dry spinning are N,N-dimethylformamide, N,N-dimethylacetamide, tetramethylenesulfone, formic acid, and 60/40 1,1,2-trichloroethane/formic acid mixtures. Spinning speeds up to 1000 yards per minute have been attained, which represents excellent productivity for elastic filaments. One of the advantages of this invention is that talcing or lubricating is not required for filaments prepared from most of these compositions. Although talcing has been used successfully to prevent sticking and fusing of tacky filaments, it is always desirable to eliminate a step in a process which performs no useful function.

The properties of dry spun filaments and fibers are improved by treatment with boiling water. The benefits are not those usually associated with heat treatments, since tenacity is the only property affected. The tenacity is increased without any appreciable effect on initial modulus or elongation, which is distinctly different from the usual heat-setting or relaxing treatments.

Wet spinning can also be carried out successfully. Spinning speds are usually lower, but wet spinning processes have a definite advantage when larger denier filaments are being prepared. A preferred solvent for wet spinning is N,N-dimethylformamide, and these solutions are usually extruded into a hot water bath. Even where the coagulating and setting bath is hot water the properties of the filaments are again improved by an after-treatment with hot water. However, the effect is less marked than in the case of dry spinning.

When stable dispersions of these polymers can be prepared, the dispersion can be extruded and a shaped article prepared by coagulating the dispersion and coalescing the polymer particles. In some instances heat coalescence is satisfactory, whereas for other polymers a solvent will have to be used to promote coalescence.

Shaping and the polymerization can also be combined into a single step by a process which will be referred to as "chemical spinning." In this process shaped structures are obtained by combining at least two complementary reactive polymer intermediates by extruding at least one of the intermediates in liquid phase into one or more complementary polymer intermediates. This second phase may be a liquid or a vapor, but in the present case, which is limited in its preferred form to the combination of low molecular weight polymers having reactive end groups with hydrazine, the process will usually be restricted to extrusion of one liquid phase into another liquid phase. Either or both phases may contain a diluent. However, both phases are customarily used in as concentrated a form as possible in order to minimize the problems associated with solvent recovery. In the present case, a high solids solution of low molecular weight polymer is preferably extruded into a bath containing undiluted hydrazine hydrate.

One of the advantages of the chemical spinning process is that it provides an extra degree of freedom in the preparation of filaments and films by extrusion processes. For example, cross-linked polymers can usually not be extruded because they are relatively infusible and insoluble. Formation of cross-linked filamentary structures by after-treatment is generally unsatisfactory. However, cross-linked structures can be obtained directly by chemical spinning by use of an intermediate with a functionality greater than 2. For example, triethylenetetramine can be added to the bath along with hydrazine to provide readily available cross-linking sites along the polymer chain. Cross-linking occurs along with polymer formation and a shaped three-dimensional structure is obtained directly. The number of cross-links will usually be restricted by using only a small percentage of the reagent with the functionality greater than 2 because a tightly cross-linked structure will not have the extensibility and flexibility usually desired in filament and film applications.

Although a drawing operation is not essential, the overall properties of the films and filaments prepared from some of these copolymers are improved by a cold-drawing operation. Therefore, prior to final packaging, the yarns may be drawn at a suitable draw ratio, for example, 2 to 10× for the particular copolymer and relaxed to give a product with a desired combination of tenacity, initial modulus, yarn elongation, elasticity, and similar properties. The modifications which can be obtained in this manner are illustrated by the preparation of a high modulus fiber, as contrasted to the usual low modulus elastomer, by a combination of drawing and heat-setting. In general, these effects are obtained by drawing 4–6× at any temperature, usually room temperature, and heat-setting under tension, preferably on a bobbin, at a higher temperature in the range 100–150° C. for periods ranging from about 3 to 72 hours, depending upon the temperature. For example, a typical elastic filament of the invention was drawn 6× at room temperature and heat-set on a bobbin to yield a high modulus filament with the following properties: tenacity =0.90 g.p.d., elongation=302%, and $M_{50}$=0.14 g.p.d.

The superior resistance of the polymers of this invention to degradation by ultraviolet light was demonstrated by comparing the elastic filaments prepared from a polymer of this invention to those prepared from a polymer obtained by substituting ethylenediamine for hydrazine. The polyurea filaments derived from ethylenediamine are as stable under the influence of ultraviolet light as any polymers known prior to the polymers of this invention. After 5 hours of exposure to light in the Fade-Ometer the polyurea fiber was too weak to test, whereas the polyureylene fiber (the one derived from hydrazine) had the following properties: tenacity =0.84 g.p.d., elongation=730%, initial modulus=0.05 g.p.d., tensile recovery=100%, and stress decay=2.4%.

The oxidative stability of the polymers of this invention is also very good. This is shown clearly by comparing the effect of heating filaments prepared from elastic polyureylenes in air and comparing the results obtained by heating a polyurea filament of comparable composition prepared by substituting ethylenediamine for hydrazine. The measurements were not made at identical periods, but it is obvious from the results that this is not an important consideration.

|  | Control | Polyurea, 64 Hrs. at 105° C. | Control | Polyurelyene, 70 Hrs. at 105° C. |
|---|---|---|---|---|
| Tenacity (g.p.d.) | 0.8 | 0.3 | 0.83 | 1.10 |
| Elongation (percent) | 673 | 769 | 776 | 687 |

The combinations of good heat, oxidative, and ultraviolet light stability of elastomers derived from hydrazine is reflected in their excellent color stability. Many synthetic elastomers become visibly yellow in 12 to 24 hours of normal exposure to atmospheric conditions, including exposure to sunlight. Under comparable conditions the elastomers of this invention show no visible yellowing after two weeks of exposure.

The elastomers prepared according to this invention have many varied uses. They may be employed in the preparation of tires, innertubes, belts, hose and tubing, wire and cable jackets, footwear, sponges, coated fabrics, fibers, filaments, bristles, films, woven and non-woven fabrics, felts, papers, and a wide variety of coated or molded articles. The fact that the properties of these filaments, such as tenacity and elongation, may be controlled over a farily wide range makes them good candidates for the cores of golf balls. The polymers are also well adapted for use as golf ball covers because of their toughness and good abrasion resistance.

The polymers possess a number of advantageous properties, including excellent resistance to heat and cold, direct sunlight, oxygen and ozone, oil and other hydrocarbon solvents. They display unusually outstanding resistance to mechanical abrasion and to deterioration caused by flexing, stretching, and the like. Since they have a low brittle point, they are particularly useful for fabricating articles to be used at low temperatures. This combination of properties suggests the use of these polymers as uncovered filaments in elastic fabrics and garments. Obviously, these filaments and fibers will also be useful in fabrics and garments when they are covered, as rubber is for such applications.

The elastomeric properties of these materials may be varied by suitable compounding. The amount and type of compounding agent to be incorporated in the stock is dependent upon the use for which the elastomer is intended. The compounding agents ordinarily used in the rubber industry with either natural or synthetic rubber are useful for the products of this invention. These include carbon black, clay, silica, talc, zinc and magnesium oxides, calcium and magnesium carbonates, titanium dioxide, and plasticizers. Inorganic and organic coloring agents may be incorporated to give a well defined color. The compounding agents may be incorporated with the elastomer at the same time as additional diisocyanate is added prior to curing. Conventional rubber processing machinery, such as rubber mills or Werner-Pfleiderer or Banbury mixers may be used. The resulting compounded stock may be shaped and cured in conventional equipment used in the rubber industry.

The compounded, uncured elastomers of this invention may be dissolved in, or extended with, solvents to permit their application as coatings. Suitable organic liquids for this purpose include N,N-dimethylformamide, N,N-dimethylacetamide and tetrahydrofuran. Smooth films can be formed by evaporating the solvent.

The elastic polymer filaments and yarns of this invention are characterized by higher strength and stretch modulus and substantially better abrasion resistance than any rubber threads known. Stretch modulus measures the force required to elongate the yarn a given percentage. A garment prepared from yarns having high tenacity and high stretch modulus will not only be durable, but will also exert substantial pressure on the body of the wearer after the garment is stretched into position.

Yarns of this invention have many advantages over rubber threads. For example, they may be spun readily as multifilament yarns and as low denier filaments. They have superior abrasion resistance, a higher modulus, a very low inherent color, may be dyed by common dyestuffs, need no plasticizers which might later be leached out of the yarn, and have a good resistance to perspiration or greases and many other common chemicals. Furthermore, these elastic yarns are capable of very quick elastic recovery, a property which is lacking in many of the so-called elastic fibers.

It will be apparent that many widely different embodiments of this invention may be made without departing from the spirit and scope thereof, and therefore it is not intended to be limited except as indicated in the appended claims.

We claim:

1. A synthetic copolymer consisting essentially of a plurality of repeating intralinear structural units represented by the formula

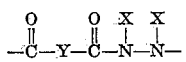

wherein X is selected from the group consisting of hydrogen and a monovalent organic radical, said monovalent organic radical being free of active hydrogen and of groups reactive with active hydrogen, not more than one X being an aromatic radical attached directly to an N of the above formula, and Y is a polymeric residue free from intralinear nitrogen atoms other than those connected to intralinear atoms selected solely from the group consisting of carbon and sulfur, said residue having a molecular weight above about 700 and being the radical remaining after removal of the carbonyl-containing portions of the terminal groups from a difunctional organic polymer having two terminal carbonyl-containing groups reactive with a hydrogen of a hydrazine of the formula NHX-NHX to form an intralinear group of the formula

said carbonyl-containing portions being selected from the group consisting of

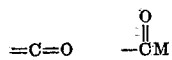

and

wherein X has the significance defined above and M is halogen, said difunctional organic polymer having a melting point less than about 60° C., said polymeric residue being essentially free of active hydrogen and groups reactive with active hydrogen, at least 60% by weight of said synthetic copolymer being provided by said polymeric residues.

2. The synthetic copolymer of claim 1 wherein X is hydrogen.

3. The synthetic copolymer of claim 1 in the form of a filament.

4. The synthetic copolymer of claim 1 in the form of a film.

5. The synthetic copolymer of claim 1 wherein said polymeric residue has a molecular weight between 800 and 8000.

6. A synthetic copolymer consisting essentially of a plurality of intralinear structural units having the formula

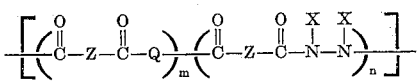

wherein X is selected from the group consisting of hydrogen and a monovalent organic radical, said monovalent organic radical being free of active hydrogen and groups reactive with active hydrogen, not more than one X being an aromatic radical attached directly to an N of the above formula, m and n are positive integers, Z is a non-polymeric bivalent organic radical inert to isocyanate groups, and Q is the polymeric residue remaining after removal of the terminal active hydrogens H from a difunctional organic polymer H—Q—H having a melting point below about 60° C. and a molecular weight above about 700, said polymeric residue being free from intralinear nitrogen atoms other than those connected to intralinear atoms selected solely from the group consisting of carbon and sulfur, the radicals Z and X being so selected that the structure

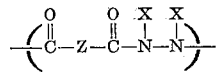

represents a repeating unit of a fiber-forming polymer having a melting point above about 200° C. in its fiber-forming molecular weight range, from about 60% to about 95% by weight of said synthetic copolymer being provided by the structures

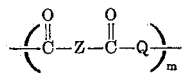

7. The synthetic copolymer of claim 6 wherein X is hydrogen.

8. The synthetic copolymer of claim 6 wherein said difunctional organic polymer has a molecular weight between 800 and 8000.

9. The synthetic copolymer of claim 6 wherein said difunctional organic polymer has a molecular weight between 1000 and 2500.

10. The synthetic copolymer of claim 8 in the form of a filament which is elastic at room tempertaure.

11. The synthetic copolymer of claim 6 wherein said difunctional organic polymer is a polyether.

12. The synthetic copolymer of claim 11 wherein said polyether is a poly(alkylene oxide).

13. The synthetic copolymer of claim 6 wherein said difunctional organic polymer is a polyester.

14. The synthetic copolymer of claim 6 wherein said difunctional organic polymer is a polyurethane.

15. A synthetic copolymer consisting essentially of a plurality of intralinear structral units having the formula

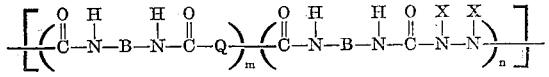

wherein X is selected from the group consisting of hydrogen and a monovalent organic radical, said monovalent organic radical being free of active hydrogen and groups reactive with active hydrogen, not more than one X being an aromatic radical attached directly to an N of the above formula, m and n are positive integers, B is a non-polymeric bivalent organic radical inert to isocyanate groups, and Q is the polymeric residue remaining after removal of the terminal active hydrogens H from a difunctional organic polymer H—Q—H having a melting point below about 60° C. and a molecular weight above about 700, said polymeric residue being free from intralinear nitrogen atoms other than those connected to intralinear atoms selected solely from the group consisting of carbon and sulfur, the radicals B and X being so selected that the structure

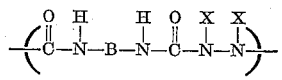

represents a repeating unit of a fiber-forming polymer having a melting point above about 200° C. in its fiber-forming molecular weight range, from about 60% to about 95% of said synthetic copolymer being provided by the structures of the formula

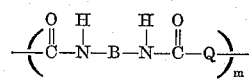

16. The synthetic copolymer of claim 15 wherein X is hydrogen.

17. The synthetic copolymer of claim 16 wherein said difunctional organic polymer is a polyether glycol.

18. The synthetic copolymer of claim 16 in the form of a filament which is elastic at room temperature.

19. The process for preparing a synthetic linear copolymer which comprises reacting a hydrazine having the formula

wherein X is selected from the group consisting of hydrogen and a monovalent organic radical, said monovalent organic radical being free of active hydrogen and groups reactive with active hydrogen, not more than one X being an aromatic radical attached directly to an N of the above formula, with an essentially stoichiometric amount of a difunctional organic polymer which is free from intralinear nitrogen atoms other than those connected to intralinear atoms selected solely from the group consisting of carbon and sulfur, said difunctional organic polymer having a molecular weight above about 700, a melting point below about 60° C. and terminal carbonyl-containing groups reactive with a hydrogen of said hydrazine to form an intralinear group of the formula

said difunctional organic polymer being otherwise essentially free of active hydrogen and groups reactive with active hydrogen, said polymer being present in the reaction to provide at least 60% of the weight of said synthetic copolymer.

20. The process of claim 19 wherein X is hydrogen.

21. The process for preparing a synthetic linear copolymer which comprises heating a difunctional hydroxyl-terminated polymer having a molecular weight above about 700 and a melting point below about 60° C. with an organic diisocyanate in a molar ratio of less than 1:1 to produce a low molecular weight isocyanate-terminated polymer, and thereafter reacting the resulting isocyanate-terminated polymer with an essentially stoichiometric amount of hydrazine, said diisocyanate and said hydrazine being complementary monomers capable of forming a linear polymer having a melting point above about 200° C. in the fiber-forming molecular weight range, said difunctional polymer being present in said synthetic copolymer to provide at least 60% of its weight.

22. The process of claim 21 wherein said difunctional hydroxyl-terminated polymer is a poly (alkylene oxide) glycol.

23. The process of claim 21 wherein said reaction is carried out in a homogeneous solution.

24. The process for preparing a synthetic linear copolymer which comprises heating a difunctional hydroxyl-terminated polymer having a molecular weight above about 700 and a melting point below about 60° C. with an organic diisocyanate in a molar ratio of less than 1:1 to produce a low molecular weight isocyanate-terminated polymer, and thereafter extruding said isocyanate-terminated polymer into a bath containing at least a stoichiometric amount of hydrazine to form a filament.

25. A cured elastomer prepared by admixing with the polymer of claim 1 between 1% and 20% by weight of an organic diisocyanate and thereafter heating the mixture at a temperature of about 130° C. to about 150° C. for about thirty minutes.

References Cited in the file of this patent

UNITED STATES PATENTS

| | | |
|---|---|---|
| 2,829,984 | Yeager | Apr. 8, 1958 |
| 2,833,740 | Verbanc | May 6, 1958 |

FOREIGN PATENTS

| | | |
|---|---|---|
| 70,358 | Norway | Apr. 29, 1946 |
| 519,014 | Belgium | Oct. 5, 1953 |
| 903,947 | France | Feb. 12, 1945 |
| 1,112,409 | France | Nov. 16, 1955 |

OTHER REFERENCES

Saunders et al., Chemical Reviews, pages 203–218, vol. 43 (1948).

UNITED STATES PATENT OFFICE
CERTIFICATE OF CORRECTION

Patent No. 2,957,852                                October 25, 1960

Peter E. Frankenburg et al.

It is hereby certified that error appears in the printed specification of the above numbered patent requiring correction and that the said Letters Patent should read as corrected below.

Column 1, lines 19 and 20, for "prodcuts" read -- products --; column 2, line 25, for "melocular" read -- molecular --; column 5, line 50, for "N.N-dimethylformamide" read -- N,N-dimethylformamide --; column 6, line 52, strike out "to"; column 7, line 24, for "1,140" read --1,410 --; column 16, line 8, for "unstisfactory" read -- unsatisfactory --; column 18, line 39, for "farily" read -- fairly --; column 20, line 48, for "tempertaure" read -- temperature --; line 58, for "structral" read -- structural --; column 22, list of references cited, under "UNITED STATES PATENTS", after line 39, insert the following:

2,281,576    Hanford -------------- May 5, 1942
    2,356,702    Schlack -------------- Aug. 22, 1944 same column 22, list of references cited, under "FOREIGN PATENTS", after line 45, insert the following:

220,499    Swiss ---------------- July 16, 1942
  1,074,451    France --------------- Oct. 6, 1954

Signed and sealed this 18th day of April 1961.

(SEAL)
Attest:

ERNEST W. SWIDER                                  DAVID L. LADD
Attesting Officer                                   Commissioner of Patents